United States Patent [19]

Scott et al.

[11] 4,215,881
[45] Aug. 5, 1980

[54] HOSE COUPLING

[75] Inventors: Daniel G. Scott, Wilkinburg; William K. Mong, N. Huntingdon, both of Pa.

[73] Assignee: Westinghouse Air Brake Company, Wilmerding, Pa.

[21] Appl. No.: 973,348

[22] Filed: Dec. 26, 1978

[51] Int. Cl.² .......................... F16L 35/00; B60D 1/08
[52] U.S. Cl. ..................................................... 285/68
[58] Field of Search ........................ 285/68, 69, 65, 74

[56] References Cited

U.S. PATENT DOCUMENTS 4,133,561   1/1979   Cannon et al. .......................... 285/68

Primary Examiner—Thomas F. Callaghan
Attorney, Agent, or Firm—R. S. Visk; R. W. McIntire, Jr.

[57] ABSTRACT

An improved hose coupling for railway vehicle brake pipe hoses, which hose coupling is characterized by a nipple portion disposed at an angle relative to the axis of the coupling head and an angular extension of the lower end of the coupling lip for preventing premature or inadvertent uncoupling due to excessive bouncing motion of the vehicle and, therefore, vertical oscillation of the hoses.

4 Claims, 3 Drawing Figures

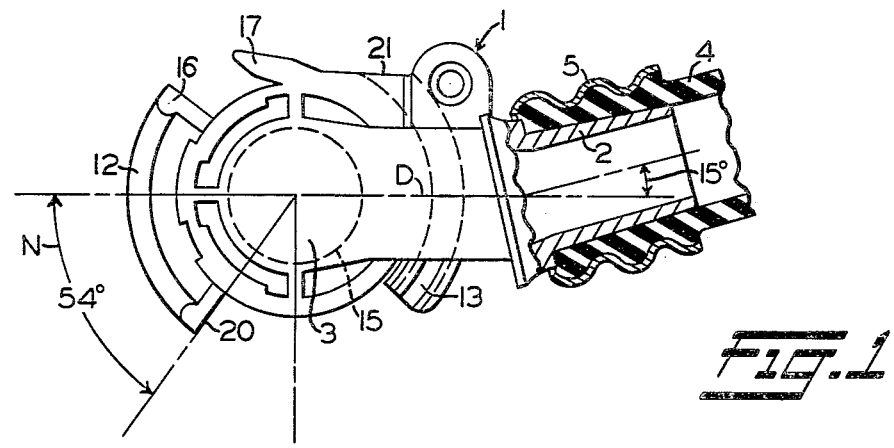
Fig.1
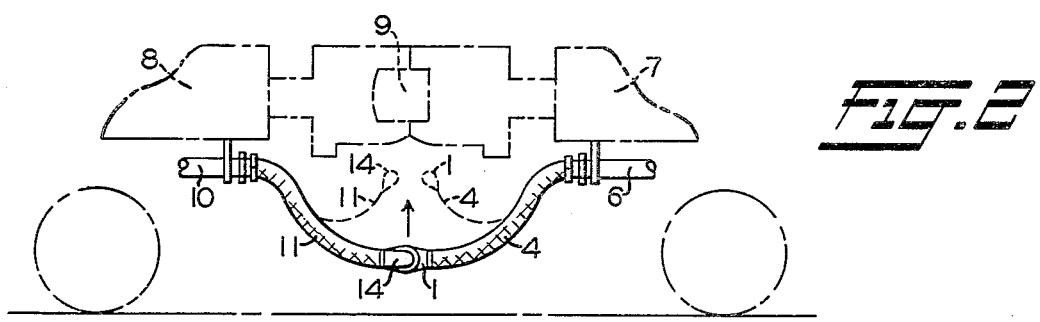
Fig.2
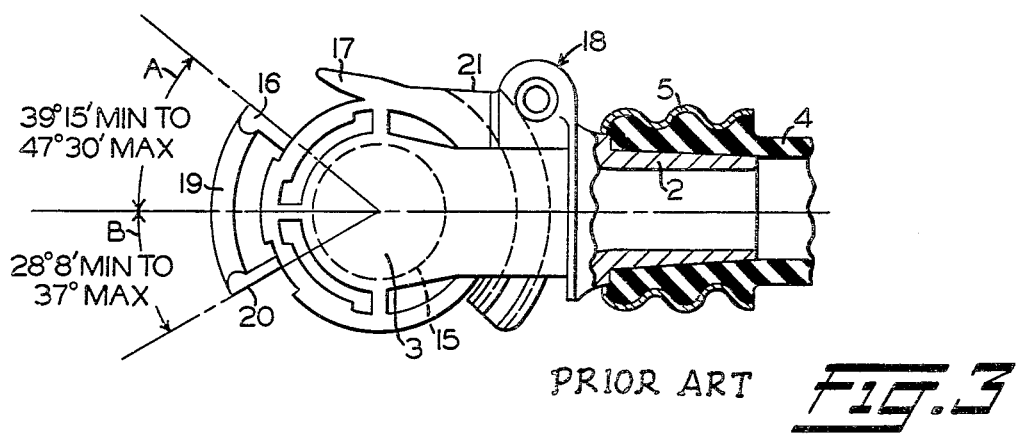
PRIOR ART Fig.3

HOSE COUPLING

BACKGROUND OF THE INVENTION

The nipple or shank end of presently used hose coupling are disposed at a standard 15° angle relative to the body of the hose coupling so as to allow the hoses to hang between the cars such that the engaged couplings are fully rotated to a fully engaged position. With certain type of railway cars, however, such as the long-underframe type, the coupled hoses assume a relatively horizontal disposition rather than a sagging disposition, in which case the coupling heads may not be fully rotated to a fully engaged position, that is, the engaged couplings are forced to partially rotate in a direction of uncoupling or disengagement. Consequently, any bounce of the hose or striking of the coupling by a foreign object may raise the coupling to a level sufficient for effecting uncoupling and an undesired emergency brake application.

In order to prevent untimely or undesired disengagement of the hose coupling, self-locking hose couplings having automatically latching mechanisms have been proposed. These designs have proven to be cumbersome, unreliable in disengagement, susceptible to freezing and considerably more costly to manufacture.

Also proposed, as a means of preventing untimely disengagement of hose couplings, is a coupling having a straight shank and an increased coupling lip angle. The straight shank was intended to force the couplings to be further rotated toward a fully engaged position, while the increased lip angle was intended to further assure coupling engagement over a wider range of rotation in the coupling direction. Subsequently, however, with the approval of usage of a "softer" hose, the straight shank coupling produced kinking of the hose and consequently restriction of air flow therethrough.

SUMMARY OF THE INVENTION

The object of the present invention is to provide an improved hose coupling which permits use of the "softer" hose without resultant kinking and which is less susceptible to inadvertent uncoupling due to oscillation, without the use of positive locking devices, yet providing normal facility of manual uncoupling.

The object of the invention is attained by providing an improved hose coupling having a nipple portion or shank disposed at the usual 15° angle relative to the body of the coupling to accommodate the "softer" hose which is more desirable for use during extremely cold temperatures. Moreover, the lower extremity or that end of the arcuate lip extending below the axis of the coupling when the hoses are coupled, has been angularly increased or extended to thereby necessitate a greater amount of relative rotation between the coupling bodies, when uncoupling the connected hoses, for effecting uncoupling thereof. Thus, because of the angular extension of the lower lip portion, inadvertent uncoupling due to bouncing or oscillation of the hoses is appreciably lessened.

BRIEF DESCRIPTION OF THE DRAWINGS

FIG. 1 is an elevational view, partly in section of an improved hose coupling;

FIG. 2 is a schematic view, on a smaller scale than FIG. 1, showing a pair of hoses on adjacent cars in a coupled relation; and FIG. 3 is an elevational view, partly in section and on the same scale as FIG. 1, showing a hose coupling representing the present state of the art.

DESCRIPTION AND OPERATION

The hose coupling herein disclosed comprises an improvement of the hose coupling disclosed in copending application Ser. No. 793,665, filed May 4, 1977, and assigned to the assignee of the present application.

As shown in FIG. 1, a railway car brake pipe hose coupling 1 embodying the invention is provided with a nipple portion 2 offset at an angular disposition relative to a hollow body portion 3 through which fluid pressure may flow to or from said nipple portion. The offsetting angle of nipple portion 3 in a standard or conventional coupling, and in the coupling herein disclosed, may be, for example 15° as indicated in FIG. 1. By using the angled nipple or shank, the "softer" hose above mentioned may be employed therewith.

A brake pipe hose 4 has one end sealingly secured by a clamp 5 to nipple 2, the other end of said hose, as may be seen in FIG. 2, being connected to an end of a brake pipe 6 extending the length of a railway car 7 only a fragmentary portion of which is shown in broken outline in FIG. 2. Also shown is a portion of an adjoining railway car 8 coupled to car 7 by a coupler 9 and similarly equipped, as car 7, with a brake pipe 10 and a brake hose 11 shown in coupled relation with hose 4 of car 7.

Hose coupling 1 is also provided with an arcuately-shaped lip 12 at the peripheral edge of body portion 3 axially opposite nipple 2. The purpose of lip 12, as is known to those skilled in the art, is to rotatably engage a complementary arcuate groove or channel similar to that designated 13 on coupling 1 but on a counterpart coupling, such as 14, as shown in FIG. 2. A similar lip (not shown) formed on counterpart coupling 14 engages groove 13 formed on coupling 1 for holding the hose couplings in a mated relationship as shown in FIG. 2. Lip 12 and groove 13 are disposed peripherally on diametrically opposite sides of and in concentric relation to a circular opening 15 (shown in broken outline in FIG. 1) in body portion 3, and at opposite ends of a diameter D passing through said opening and coinciding with the axis of the coupling.

Two brake pipe hoses on adjacent coupled cars, such as hoses 4 and 11 on cars 7 and 8 for example, may be coupled in well-known manner by lifting the respective ends of the hoses relative to the ground or track bed in the direction indicated by the arrow and to positions shown in phantom outline in FIG. 2, bring the hose couplings 1 and 14 together to engage lips 12 in the counterpart grooves 13, respectively, then allowing the hoses to drop by their own weight. As the hoses drop to a normal hanging position as shown in FIG. 2, the two couplings 1 and 14 rotate relative to each other until a coupled relation is attained, such relative rotation, and therefore said coupled position, being limited by abutting contact of an upper extremity or end 16 of lip 12 with a stop member or spur on the counterpart coupling and designated 17 on coupling 1, said spur being formed tangentially on the upper side, as viewed only in FIG. 1, of both hose couplings 1 and 14. Spurs 17 are so located as to engage ends 16 of lips 12 of couplings 1 and 14, respectively, when the couplings have attained the appropriate coupled position, that is, a substantially axially aligned position, as shown in FIG. 2.

In order to uncouple hoses 4 and 11, the hoses must again be raised in the direction indicated by the arrow in FIG. 2 for effecting counter rotation between hose couplings 1 and 14 until the lips 12 are clear of the respective grooves 13 so that the couplings may be separated from each other and uncoupled.

As was hereinbefore noted, when the cars 7 and 8 are in motion, there may be such bouncing of the cars as to cause the coupled hoses 4 and 11 to be bounced high enough to cause inadvertent uncoupling thereof.

A hose coupling 18, as shown in FIG. 3, represents a presently known standard coupling as approved by the Association of American Railroads (AAR). Hose coupling 18, as shown in FIG. 3, differs from hose coupling 1, in that the nipple portion 2 is axially aligned with the body portion 3, and that portion of a lip 19 below the centerline of the coupling is of lesser angular dimension than the corresponding lip portion of hose coupling 1, in accordance with the invention.

By referring to FIG. 3, a comparison of the angular dimensions of lip 19 of the standard hose coupling 18 may be made with the new angular dimensions of lip 12 of the improved hose coupling 1 shown in FIG. 1. The upper portion of either lip 12 or 19 disposed above the axis or centerline of the respective hose couplings, according to AAR standards, may range from a minimum of 39° 15' to a maximum of 47° 30'. This dimension, which is not critical to the invention, is designated as A in FIG. 3 of the drawing. The angular dimension of a lower portion of lip 19 disposed below the centerline of hose coupling 18, according to presently known couplings, ranges from 28° 8' to 36°, which dimension is designated B in FIG. 3 of the drawing. Since dimension B, as will become evident hereinafter, is the critical dimension to the invention, said dimension B has been increased to a new dimension of 54° in new hose coupling 1, said new dimension of 54° being shown and designated by the letter N in FIG. 1. This new dimension of 54° may vary from minus 5° to plus 5°.

When the improved hose coupling 1 is employed, by having the nipple portion 2 angled relative to body portion 3, the "softer" type hose may be used with a lesser probability of kinking adjacent said nipple portion.

Moreover, by extending dimension B of the lower portion of lip 12 below the coupling centerline to dimension N, or 54°, a greater amount of counterrotation between two hose couplings similar to coupling 1, when uncoupling, is required before lower radial ends or edges 20 of the lips 12 rotatably clear upper radial ends 21 (see FIG. 1) of upper portions of grooves 13 disposed on the upper side of the centerline of the counterpart hose couplings, respectively, to permit separation thereof. Because of this additional amount of counterrotation required before separation of the couplings can be effected, the coupled hoses 4 and 11 must be raised to a higher level than presently required in order to effect uncoupling thereof.

It is evident, therefore, that the angular increased dimension of the lower portion of lip 12 of the improved hose coupling 1 makes inadvertent uncoupling of adjacent coupled brake hoses less likely.

Having now described the invention, what we claim as new and desire to secure by Letters Patent, is:

1. An improved brake hose coupling for use with a railway vehicle brake hose to be coupled with a counterpart hose coupling of a counterpart brake hose of an adjacent vehicle, each of said hose couplings comprising:
   (a) a hollow body portion having an opening therein for registering with a complementary opening in the counterpart hose coupling;
   (b) a nipple portion joined to said body portion in an angularly offset relationship thereto and communicable with said opening through the hollow body portion;
   (c) said body portion having an arcuate groove formed thereon between said opening and said nipple portion, peripherally adjacent and in concentric relation to said opening, and transversely to the axis of the coupling, said axis dividing said groove into an upper portion and a lower portion disposed on opposite sides thereof;
   (d) an arcuate lip portion formed on said body portion peripherally adjacent and in concentric relation to said opening, diametrally opposite said arcuate groove, and transversely to the axis of the coupling for rotatably engaging the arcuate groove of the counterpart hose coupling, and vice versa, for retaining the two hose couplings in coupled relationship upon a certain amount of relative rotation in one direction therebetween, said axis dividing said lip portion into upper and lower portions disposed on opposite sides thereof; and
   (e) stop means formed on said body portion for limiting said relative rotation to said certain amount in said one direction,
   (f) said hose couplings being operable, upon said certain amount of relative rotation in a direction opposite to said one direction to an uncoupled disposition in which said lip portions rotatably disengage said grooves, respectively,
   (g) the angular dimension of the upper portion of said lip portion being up to a maximum of 47° 30', and the angular dimension of the lower portion of said lip being 54°.

2. An improved brake hose coupling, as set forth in claim 1, wherein the angular dimension of said upper portion of said lip portion lies within a range between a minimum of 39° 15' and a maximum of said 47° 30'.

3. An improved hose coupling, as set forth in claim 1, wherein the angular dimension of 54° of said lower portion of said lip portion may vary plus or minus 5°.

4. An improved hose coupling, as set forth in claim 1, wherein the angular offset of the nipple portion relative to the body portion is substantially 15°.

* * * * *